(12) United States Patent
Iwabuchi et al.

(10) Patent No.: US 7,681,224 B2
(45) Date of Patent: Mar. 16, 2010

(54) METHOD AND SYSTEM FOR TRANSMITTING DATA OF MOVING PICTURE, AND APPARATUS FOR DELIVERING AND RECEIVING DATA OF MOVING PICTURE

(75) Inventors: Kazunori Iwabuchi, Yokohama (JP); Takeo Tomokane, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1490 days.

(21) Appl. No.: 11/011,161

(22) Filed: Dec. 15, 2004

(65) Prior Publication Data

US 2005/0213668 A1   Sep. 29, 2005

(30) Foreign Application Priority Data

Mar. 24, 2004   (JP)   ............... 2004-087096

(51) Int. Cl.
*H04N 7/173* (2006.01)
(52) U.S. Cl. .................. 725/94; 725/90; 725/135
(58) Field of Classification Search ............ 725/90, 725/94, 135
See application file for complete search history.

(56) References Cited

U.S. PATENT DOCUMENTS

2004/0003399 A1 *   1/2004   Cooper .................. 725/38
2004/0210944 A1 *  10/2004   Brassil et al. .......... 725/135

FOREIGN PATENT DOCUMENTS

| JP | 09-116596 | 5/1997 |
|---|---|---|
| JP | 2000-115003 | 4/2000 |
| JP | 2001-094892 | 4/2001 |
| JP | 2002-359609 | 12/2002 |

OTHER PUBLICATIONS

Study on IP Multicast Error Collection Control With FEC and ARQ In Wireless Link, Harashita et al, Multimedia Laboratories, NTT DoCoMo, Inc., 2003 General Meeting In The Institute of Electronics Information and Communication Engineers.

* cited by examiner

*Primary Examiner*—Hunter B. Lonsberry
(74) *Attorney, Agent, or Firm*—Antonelli, Terry, Stout & Kraus, LLP.

(57) ABSTRACT

In the transmission of a moving picture, when the user switches video sources (for example, switches channels or starts reproducing a recorded program), the selected video source can be swiftly started to display. Immediately after a delivery apparatus makes a video source be selected by switching, a receiving apparatus causes a selector to select the video packets transmitted not through an error corrector and to supply them to a decoder and it controls the decoder to generate a frozen frame from the video packets and to supply it to a display where it is displayed. The selector is controlled to produce the error-corrected video data after a counter counts a delay time that the video packets undergo in the error corrector. Thus, the moving picture can be seamlessly displayed, and the delay in the error corrector can be apparently eliminated.

8 Claims, 7 Drawing Sheets

COMMAND INTERPRETER 10 AND DELIVERY CONTROLLER 11
COMMAND INTERPRETER 19 AND RECEIVING CONTROLLER 18

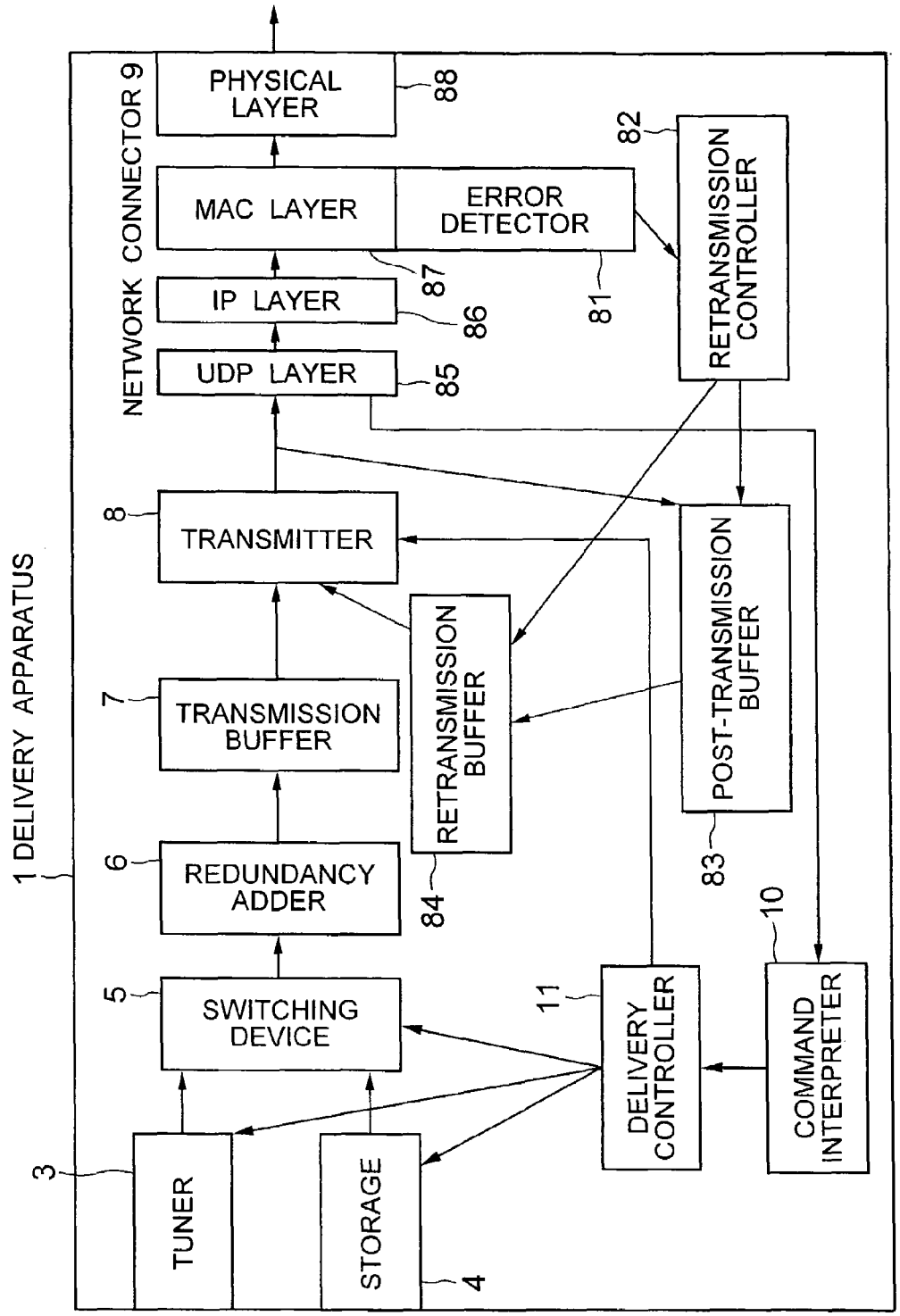

METHOD AND SYSTEM FOR TRANSMITTING DATA OF MOVING PICTURE, AND APPARATUS FOR DELIVERING AND RECEIVING DATA OF MOVING PICTURE

INCORPORATION BY REFERENCE

The present application claims priority from Japanese application JP 2004-087096 filed on Mar. 24, 2004, the content of which is hereby incorporated by reference into this application.

BACKGROUND OF THE INVENTION

The present invention relates to a method and system for transmitting data of moving picture, and apparatus for delivering and receiving data of moving picture, and particularly to a method of transmitting data of moving picture between information technology devices connected by an IP network as transmission lines, a transmission system using this transmission method, and data-delivering and data-receiving apparatus that constitute this transmission system.

When IP packets of data of moving picture are transmitted through the IP network of transmission lines, and particularly when the IP network is a wireless network, delay of the data of moving picture and dropout of packets may occur with ease depending upon the quality of the transmission lines. There is a prior art in which some error correction system is used to compensate for the lost packets, thus preventing the dropout of packets of moving picture data mentioned above. For example, in JP-A-09-116596, the property that the transmission lines cause sequential change of delay time is utilized such that the error correction system is switched on and off after measuring the transmission delay time.

In addition, when digital broadcasts are received, although decoding the data of a digital broadcast will cause delay in the reproduced output, the next channel broadcast is required to fast display when the user changes channels. To meet this requirement, the prior arts of, for example, JP-A-2001-094892 and JP-A-2000-115003 are proposed. In these documents, the data on the adjacent channels are previously decoded into images, and when channels are selected or switched, the images on the selected channels can be quickly displayed.

Moreover, the prior arts regarding the error correction system are proposed. That is, to detect error, the data link layer of the data transmission side monitors the dropout status of data and controls the amount of error correction code (in JP-A-2002-359609) or the way that redundant code systems and retransmission systems are combined is devised (in General meeting of Institute of Electronics, Information and Communication Engineers, B-6-195, 2003), thus improving the data transmission quality and reducing the transmission delay.

The prior art described in JP-A-09-116596 considers the delay of data on transmission lines, but does not take into account the delay in the error correction system itself. In addition, the prior arts described in JP-A-2001-094892 and JP-A-2000-115003 consider the delay caused when the video sources are switched, but do not allow for the same delay in the error correction system as in JP-A-09-116596. The prior art described in JP-A-2002-359609 does not consider the delay caused when the video sources are switched. The prior art described in document B-6-195 of Institute of Electronics, Information and Communication Engineers, 2003 does not take into account the answer to the fast-displaying request from a particular receiver although the moving-image packets that cannot be rectified by error correction can be compensated for by a combination with a retransmission system.

In other words, the above-given prior arts all have the problem that, when user switches the video sources (such as frequent switching of channels and starting to reproduce the recorded programs) in the moving-picture transmission system, the new video source cannot be started to fast display.

SUMMARY OF THE INVENTION

According to the invention, there is provided a method and system for transmitting moving picture data so that, when the user switches video sources, a newly selected video source can be swiftly started to display, thus solving the problems caused in the prior arts mentioned above.

This invention provides a method for transmitting moving picture data between a delivery apparatus and a receiving apparatus connected by a network, wherein the delivery apparatus starts to transmit the moving picture data of a source selected according to a data source switching command transmitted from the receiving apparatus, while the receiving apparatus causes an error corrector to correct the packets of the selected moving picture data, and at the same time, until the error corrector produces corrected data, it controls a decoder to process the moving picture data not corrected yet so as to produce a frozen frame, and makes this frozen frame be displayed.

In addition, this invention provides a system for transmitting moving picture data between a delivery apparatus and a receiving apparatus connected by a network, wherein the delivery apparatus has means for switching to the moving picture data of a source according to a source switching command transmitted from the receiving apparatus, the receiving apparatus has error correcting means, selector means, a decoder, display means, and input means, and controls the input means to transmit the source switching command to the delivery apparatus, and the error correcting means to correct the packets of the moving picture data transmitted from the delivery apparatus after the switching of sources, and at the same time, until the error correcting means produces corrected data, the receiving apparatus causes the selector means to supply the moving picture data not corrected yet to the decoder so that a frozen frame can be produced from the decoder and displayed on the display means.

Also, this invention provides a delivery apparatus in a system for transmitting moving picture data between the delivery apparatus and a receiving apparatus connected by a network, this delivery apparatus having means for switching to a source according to a source switching command transmitted from the receiving apparatus, post-transmission buffer means for holding the same data as the transmitted moving picture data, and error detecting means provided within a MAC driver of a data link layer so that, when an error of the moving picture data in the data link layer is detected, the moving picture data retained in the post-transmission buffer means is retransmitted.

Moreover, this invention provides a receiving apparatus in a system for transmitting moving picture data between a delivery apparatus and the receiving apparatus connected by a network, this receiving apparatus having error correcting means, selector means, a decoder, display means, and input means, and this receiving apparatus causing the input means to transmit the source switching command to the delivery apparatus, and the error correcting means to correct the packets of the moving picture data transmitted after the source switching from the delivery apparatus, and at the same time, until the error correcting means produces corrected data, the receiving apparatus controlling the selector means to supply the moving picture data not corrected yet to the decoder so that a frozen frame can be produced from the decoder and displayed on the display means.

Thus, according to the invention, when the user switches the video sources, a new selected video source can be swiftly started to display.

Other objects, features and advantages of the invention will become apparent from the following description of the embodiments of the invention taken in conjunction with the accompanying drawings.

BRIEF DESCRIPTION OF THE DRAWINGS

FIG. 8 is a block diagram of the construction of the delivery apparatus in a moving-picture transmission system according to the third embodiment of the invention.

DESCRIPTION OF THE EMBODIMENTS

Embodiments of the moving-picture data transmission method and system, and delivery and receiving apparatus according to the invention will be described in detail with reference to the accompanying drawings.

Figure 1:
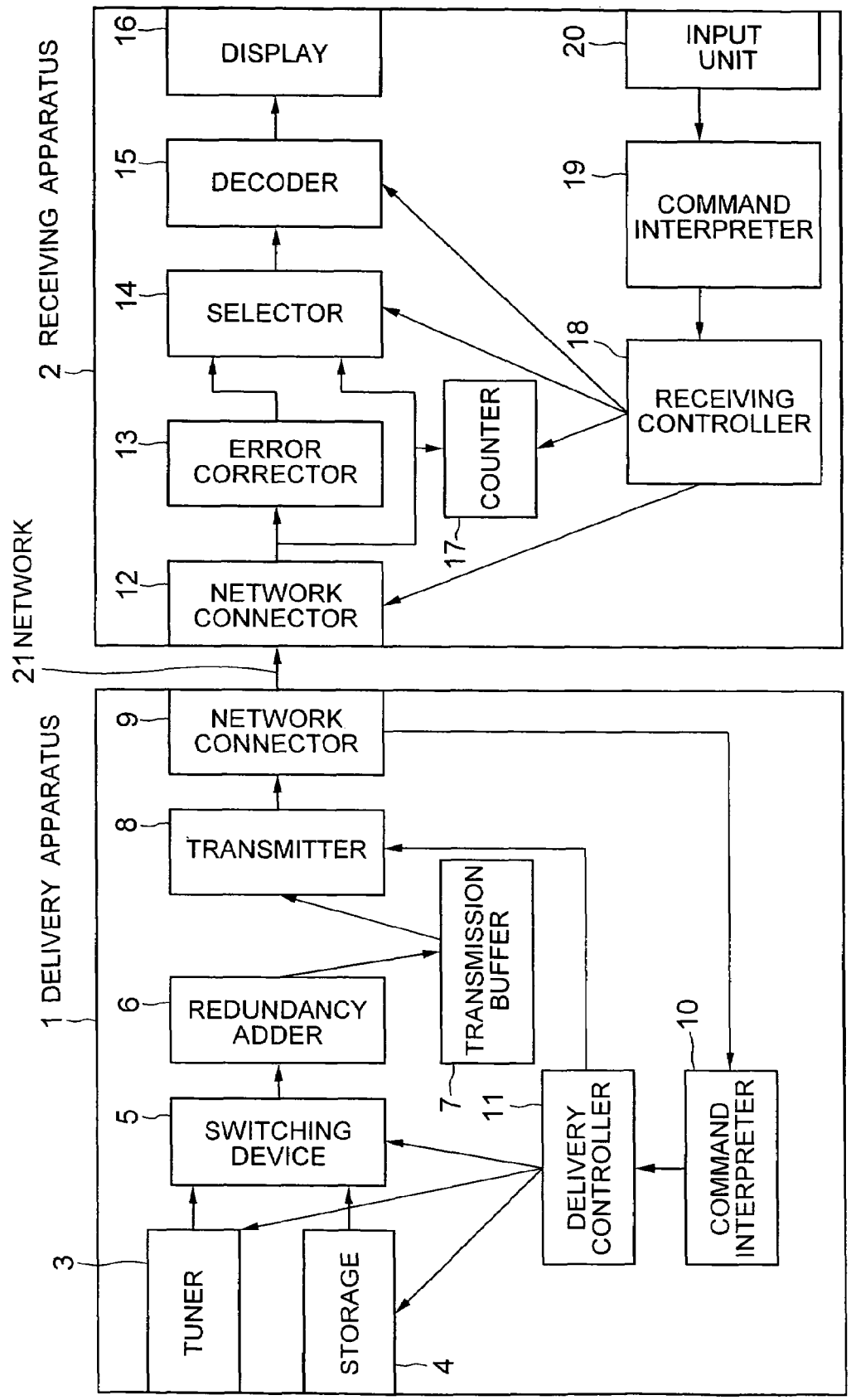
FIG. 1 is a block diagram of the construction of a moving-picture transmission system according to the first embodiment of the invention.

FIG. 1 is a block diagram showing the construction of a moving-picture data transmission system according to the first embodiment of the invention. Referring to FIG. 1, there are shown a delivery apparatus 1, a receiving apparatus 2, a tuner 3, a storage 4, a switching device 5, a redundancy adder 6, a transmission buffer 7, a transmitter 8, a network connector 9, a command interpreter 10, a delivery controller 11, a network connector 12, an error corrector 13, a selector 14, a decoder 15, a display device 16, a counter 17, an input unit 18, a command interpreter 19, a receiving controller 20, and a network 21.

In the moving-picture data transmission system according to the first embodiment of the invention, the delivery apparatus 1 and receiving apparatus 2, as illustrated in FIG. 1, are connected to each other through the network 21 by using the network connectors 9 and 12 provided in these apparatus.

The delivery apparatus 1 has the tuner 3 and storage 4 as the sources of moving-picture data such as current broadcast programs and previously recorded broadcast programs, the switching device 5 for switching these sources, the redundancy adder 6 for adding redundant codes to be able to correct errors, the transmission buffer 7 for temporarily storing the transmitted data from the redundancy adder 6, the transmitter 8 for controlling the data to be transmitted to the network 21, the network connector 9 as the interface to the network 21, the command interpreter 10 for interpreting the command sent from the receiving apparatus 2, and the delivery controller 11 that controls the whole delivery apparatus 1 and that controls the tuner 3 to switch channels and the tuner 3 and storage 4 to be switched in accordance with the command from the receiving apparatus 2.

The receiving apparatus 2 has the network connector 12 as the interface to the network 21, the error corrector 13 for correcting error of the data sent from the delivery apparatus 1, the selector 14 for selecting one of the data from the error corrector 13 and the data without error correction fed directly from the network connector 12, the decoder 15 for decoding the data, the display device 16 for displaying the decoded picture, the counter 17 for counting the amount of data (packet number) corresponding to the delay in the error corrector 13, the input unit 20 that the user operates, the command interpreter 19 for interpreting the command from the input unit 20, and the receiving controller 18 that controls the whole receiving apparatus 2 and that transmits the command to the delivery apparatus 1.

Description will be made of the flow of the processes to display the moving-picture data from the tuner 3 in the moving-picture data transmission system according to the first embodiment of the invention with the construction mentioned above.

The tuner 3 produces packets of digital moving-picture data of, for example, MPEG-2 (Moving Picture Experts Group 2). These moving-picture data packets are supplied through the switching device 5 to the redundancy adder 6. The redundancy adder 6 adds, to the data, redundant packets that are used to later correct errors, and supplies the redundancy-added data to the transmission buffer 7 where it is temporarily stored. The transmitter 8, when the data packets are stored in the transmission buffer 7, successively transmits the data packets to the network connector 9 so that they can be transmitted from the delivery apparatus 1 to the receiving apparatus 2. The receiving apparatus 2 receives the data packets via the network connector 12, and supplies them to the error corrector 13. Even if some of the data packets sent via the network 21 drop out due to the wrong conditions of network 21 as transmission lines, the error corrector 13 is able to recover only the lost packets corresponding to the number of redundant data packets added by the redundancy adder 6 of delivery apparatus 1. The output data from the error corrector 13 is supplied through the selector 14 to the decoder 15, where it is decoded into the actual moving pictures. The moving pictures thus produced are then displayed on the display device 16.

While the data packets used in this embodiment of the invention are of, for example, the format called MPEG-2 transport stream, they are not limited to this format, but may be of an arbitrary format provided that they can be decoded by the decoder 15. In addition, the redundancy adder 6, which is able to use an encoding system called FEC (Forward Error Correction), can be applied even to a high-performance error correction system that may be developed in the future.

The broadcast channels of tuner 3 and the moving pictures recorded in the storage 4 in the delivery apparatus 1 can be selected by the switching device 5 that is operated according to the command the user enters in the input unit 20 of receiving apparatus 2. The command fed from the input unit 20 is supplied to the command interpreter 19. The receiving controller 18 controls the interior of the receiving apparatus 2 depending upon the content of command fed from the command interpreter 19. If the command is to select any one of the broadcast channels of tuner 3, the receiving controller 18 transmits the command through the network 21 to the delivery apparatus 1. The delivery apparatus 1 supplies the transmitted command through the network connector 9 and through the command interpreter 10 to the delivery controller 11. When the command orders to switch the broadcast channels of tuner 3, the delivery controller 11 requests the tuner 3 to switch the broadcast channels, and controls the switching device 5 to supply the output data from the tuner 3 to the redundancy adder 6. Even when the switching device 5 switches to the storage 4 so that the storage 4 can supply its previously stored data of broadcast programs through the switching device 5, the delivery controller 11 makes the same control as described above.

The counter 17 provided within the receiving apparatus 2 as shown in FIG. 1 will be described later with reference to FIG. 5. In addition, the network 21 in the embodiment shown in FIG. 1, though not particularly limited, may be a network of standard IEEE (802.3) that uses fixed line, or of standard IEEE (802.11) that uses radio.

According to the first embodiment of the invention mentioned above, the user is able to operate the input unit, thereby causing the receiving apparatus to display on its display screen the video images on any broadcast channel or the previously recorded moving pictures so that the user can view and listen to them.

Figure 2:
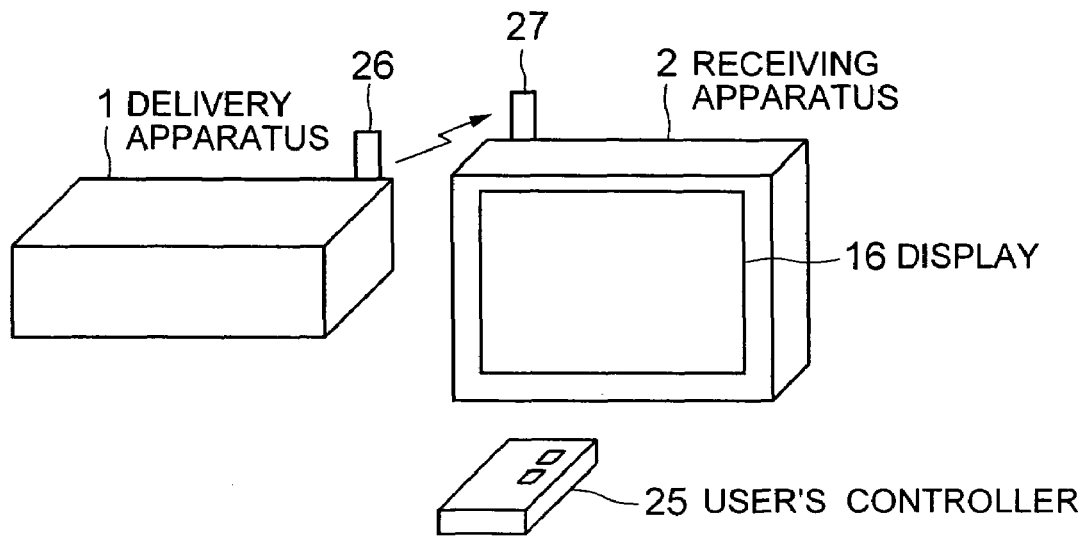
FIG. 2 is a perspective view showing the external appearance of the moving-picture transmission system according to the first embodiment of the invention.

FIG. 2 is a perspective view showing the external appearance of the moving-picture transmission system according to the first embodiment of the invention. In FIG. 2, reference numeral 25 represents a user's controller, 26 and 27 are antennas, and other reference numerals 1, 2 and 16 are the same as shown in FIG. 1.

As illustrated in FIG. 2, each of the delivery apparatus 1 and the receiving apparatus 2 in the system shown in FIG. 1 is enclosed in one separate housing, and those units 1 and 2 are connected by a wireless network as network 21. Therefore, parts of the network connectors 9 and 12 shown in FIG. 1 appear as the antennas 26 and 27. In addition, the user's controller 25 is a "remote controller" using infrared or the like, and is a part of the input unit 20 shown in FIG. 1. The user operates this remote controller 25 to order the system. When the user views and listens to a moving picture, the moving picture from the delivery apparatus 1 is transmitted from the antenna 26 to the antenna 27 of the receiving apparatus 2, and displayed on the screen of the display device 16 of receiving apparatus 2. Since the example of FIG. 2 shows that the delivery apparatus 1 and the receiving apparatus 2 are communicated with each other by radio as described above, the delivery apparatus 1 and the receiving apparatus 2 can be placed in separated rooms as long as the radio reaches each apparatus.

Figure 3:
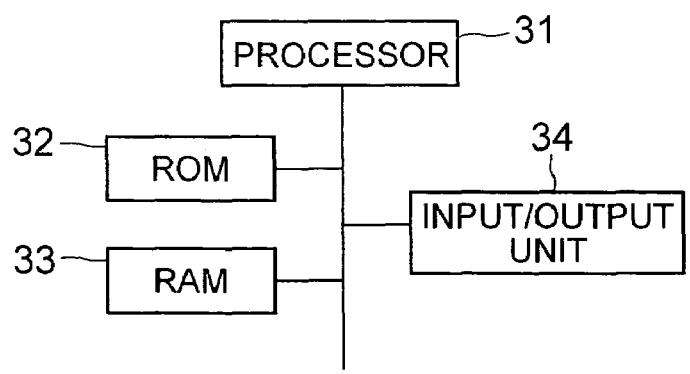
FIG. 3 is a block diagram showing a hardware structure of the command interpreter 10 and delivery controller 11 of delivery apparatus 1 and the command interpreter 19 and receiving controller 18 of the receiving apparatus 2.

FIG. 3 is a block diagram of a hardware structure of the command interpreter 10 and delivery controller 11 provided within the delivery apparatus 1 and of the command interpreter 19 and receiving controller 18 provided within the receiving apparatus 2 in the system shown in FIG. 1. That is, these interpreters and controllers each have the same hardware structure. In FIG. 3, reference numeral 31 denotes a processor, 32 a ROM, 33 a RAM, and 34 an input/output unit.

The processor 31 controls all parts of each of the command interpreter 10 and delivery controller 11 within the delivery apparatus 1 and the command interpreter 19 and receiving controller 18 within the receiving apparatus 2. The processor 31 uses programs and data stored in the ROM 32 and RAM 33 to make operations necessary for each of the functional elements. If data or others are required to temporarily store, they are written in RAM 32. Also, when operations are required for input/output to or from other functional elements within the apparatus 1 or 2, information is transmitted or collected through the input/output unit 34.

Figure 4:
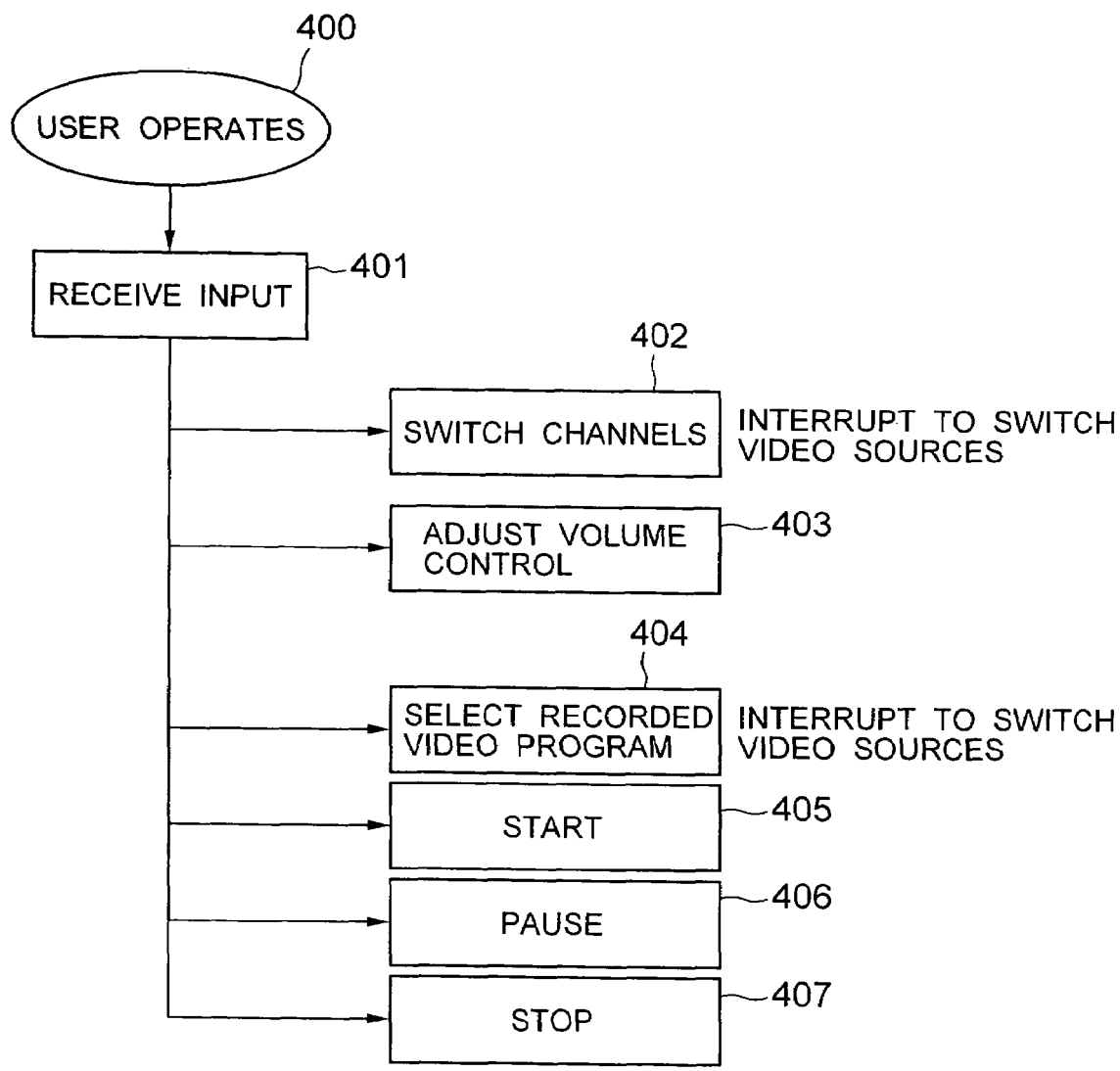
FIG. 4 is a flowchart for the operation made in response to the user's commands from the input unit 20 of the receiving apparatus 2 shown in FIG. 1.

FIG. 4 is a flowchart of the operations made in response to the instructions the user enters on the input unit 20 of the receiving apparatus 2 shown in FIG. 1. The flow of the operations will be described with reference to FIG. 4.

When the user enters an instruction on the user's remote controller 25 shown in FIG. 2, the input unit 20 receives the information of the instruction (steps 400 and 401).

The command interpreter 19 responds to the content of the instruction from the user via the input unit 20 to interpret each of the commands to switch channels in step 402, adjust the volume control in step 403, select a recorded program in step 404, start in step 405, pause in step 406, and stop in step 407.

Since the step 402 for switching channels and step 404 for selecting a recorded program are performed by the tuner 3 and storage 4 within the delivery apparatus 1, each of those commands is transmitted to the delivery apparatus 1 as a video source switching interrupt. The operations in this case will be described later with reference to FIG. 5.

The step 403 to adjust the volume control corresponds to a command to adjust the sound volume from a loudspeaker, though not shown, provided on the display device 2, and each of the steps 405, 406 and 407 corresponds to a command to start, pause and stop in the case of ordering to reproduce a recorded program stored in the storage within the delivery apparatus 1.

While examples of commands from the user's remote control are given in FIG. 4, the manufacturers can expand or cut down the commands according to the specifications of the delivery apparatus 1 and receiving apparatus 2 without the need to limit the commands to the above-given ones.

Figure 5:
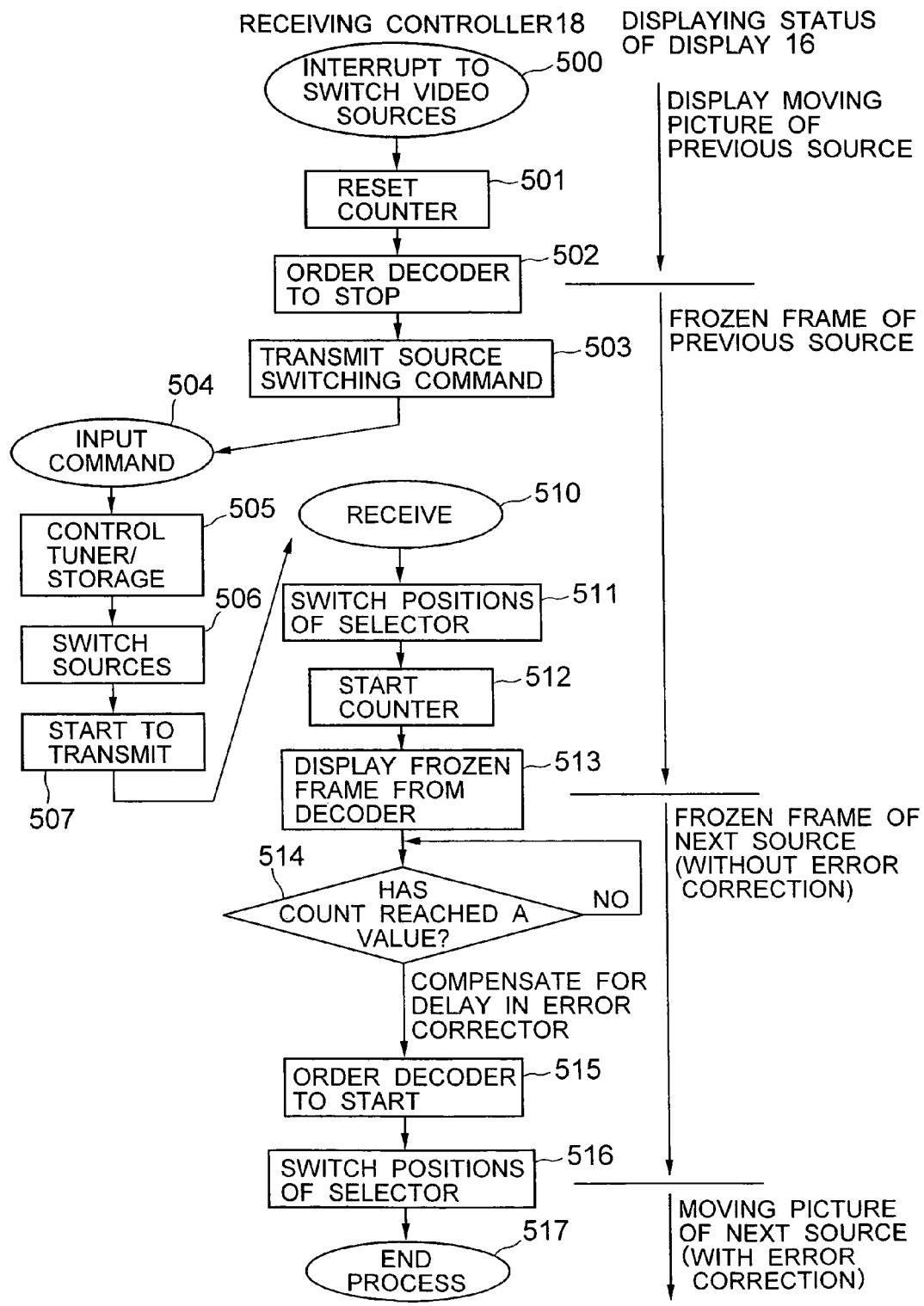
FIG. 5 is a flowchart for the transmission and reception of information between the delivery controller 11 of delivery apparatus 1 and the receiving controller 18 of receiving apparatus 2 in the first embodiment of the invention.

FIG. 5 is a flowchart of the transmission and reception of information between the delivery controller 11 of delivery apparatus 1 and the receiving controller 18 of receiving apparatus 2 in the first embodiment of the invention. This operation will be described with reference to FIG. 5. FIG. 5 also shows the status of a moving picture displayed on the display device 16 of receiving apparatus 2.

(1) When the receiving controller 18 receives the video source switching interrupt sent according to the instruction by the user as described with reference to FIG. 4, it orders to reset the counter 17 and stop the decoder 15. When the decoder 15 stops, the displaying status of the display device 16 changes to the displaying of a frozen frame of the previous source if the video source that has been displayed so far is a moving picture (steps 500~502).

(2) Then, the receiving apparatus 18 transmits a command to switch the sources. This command is transmitted to the delivery controller 11 via the network connector 12 of receiving apparatus 18, the network connector 9 of delivery apparatus 1, and the command interpreter 10 of delivery apparatus 1 (step 503).

(3) The delivery controller 11 responds to the received command to control the tuner 3 or storage 4 so that the sources from the tuner 3 or storage 4 can be switched and that the packets of data of a moving picture can be produced after the switching (steps 504 and 505).

(4) The delivery controller 11 controls the switching device 5 to switch to an ordered video source, and then controls the transmitter 8 to actuate, thus starting to transmit the packets of the selected moving picture data to the receiving apparatus 2 (steps 506 and 507).

(5) The receiving controller 18 of receiving apparatus 2, in order to receive the moving picture data after the switching, first controls the selector 14 to supply the packets of the moving picture data fed from the network connector 12 directly to the decoder 15. At this time, although the packets of the moving picture are also supplied to the error corrector 13 in the same way as fed to the selector 14, the error corrector 13 does not instantly supply to the selector 14 the packets of the corrected moving picture because of the delay in the correction process (steps 510 and 511).

(6) The receiving controller 18 controls the counter 17 to count the number of the packets of the moving picture data sent from the network connector 12 directly to the decoder 15, and at the same time orders the decoder 15 to operate so that a frozen frame of the next source can be displayed. Consequently, the display device 16 changes the displaying status so that a frozen frame of the packets of the selected moving picture not passed through the error corrector 13 can be displayed instead of the frozen frame of the previous source that has been displayed so far (steps 512 and 513).

(7) The receiving controller 18 checks the count of the counter 17 and compensates for the delay occurring until the error-corrected moving picture packets are produced from the error corrector 13. When the count reaches a predetermined value, or when the moving picture data is started to produce from the error corrector 13, the receiving controller 18 orders the decoder 15 to start decoding the moving picture data, and controls the selector 14 to select the moving picture data fed from the error corrector 13 and supply it to the decoder 15. Accordingly, the displaying status of the display device 16 is changed so that the error-corrected moving picture can be displayed. The source switching interrupt process described above is finished here (steps 513~517).

From the operations described above, it will be understood that the decoder 15, when ordered to stop, produces a frozen frame of the last data of the moving picture that has been decoded so far, and that when a frozen frame of the next source is ordered to display, it produces the first frozen frame of the next source.

The packets of the moving picture of the source selected after the switching can be supplied not through the error corrector 13, but directly to the decoder 15 and decoded in the above process. However, if this is done so, displaying of a moving picture is visually undesirable because it begins with an image gone back in time due to the delay of the image in the error corrector 13 when the selector 14 switches to the error corrector 13 side. As described above, when the first frozen frame of the next source is produced and displayed, the moving picture of the next source is started with this displayed frozen frame as the start picture when the selector 14 switches to the error corrector 13 side, and thus it can be smoothly displayed. In addition, under the condition that the first frozen frame of the next source is produced and displayed, if the user enters a source switching command as an interrupt while the output from the error corrector 13 is being waited for, for example, if the user operates the remote control to switch channels one after another, a frozen frame of the channel selected by switching is first displayed before the moving picture of that channel selected by switching is displayed, and thus the user can promptly confirm what program is now being broadcast. Therefore, this function can have the effect that it is very easy to use.

According to the first embodiment of the invention, since the receiving controller 18 controls the counter and 17 and selector 14 to compensate for the delay in the error corrector 13, there is the merit that, when the user operates the input unit to switch the video sources from the tuner 3 and storage 4, the frozen frame of the next source can be immediately displayed so that the user does not feel uneasy about the delay in the error corrector 13, and that, when the error-corrected moving picture is produced from the error corrector 13, switching can be swiftly made from the frozen frame to the moving picture.

When the moving picture selected by switching is displayed without waiting by means of the counter 17, the display device 16 displays the moving picture with only the delay in the error corrector 13, but this embodiment of the invention mentioned above can achieve swift channel switching and displaying.

Figure 6:
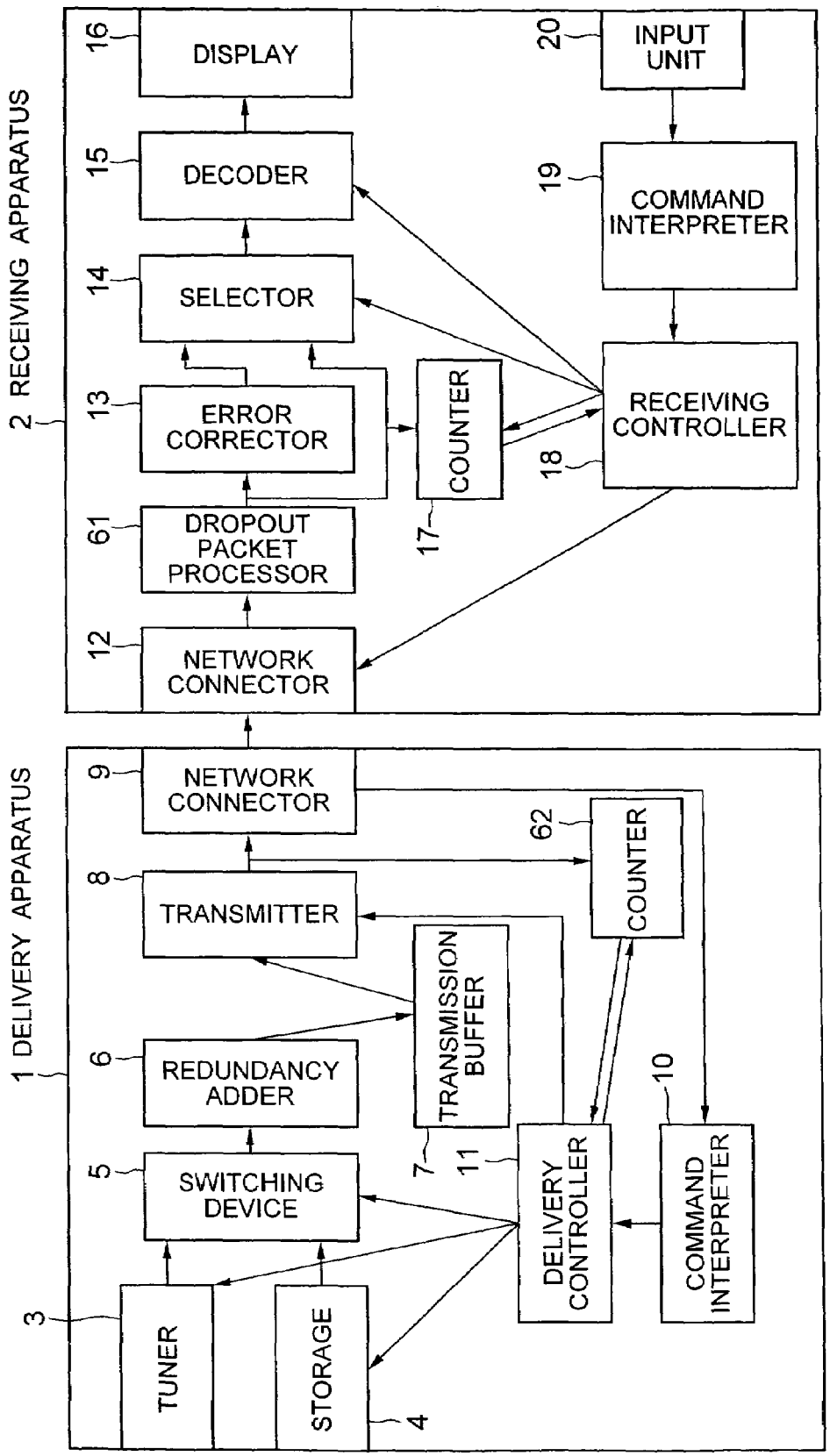
FIG. 6 is a block diagram of the construction of a moving-picture transmission system according to the second embodiment of the invention.

FIG. 6 is a block diagram of the construction of a moving-picture transmission system according to the second embodiment of the invention. In FIG. 6, reference numeral 61 represents a dropout packet processor, 62 is a counter and the other reference numerals are the same as in FIG. 1. Description will be made of portions different from the first embodiment of the invention previously mentioned with reference to FIG. 1~FIG. 5.

The second embodiment according to the invention, as illustrated in FIG. 6, is different from the first embodiment of the invention shown in FIG. 1 in that it has the counter 62 added in the delivery apparatus 1, and the dropout packet processor 61 added in the receiving apparatus 2. The counter 62 counts the packets of the moving picture produced from the transmitter 8, and it is controlled to count by the delivery controller 11.

Figure 7:
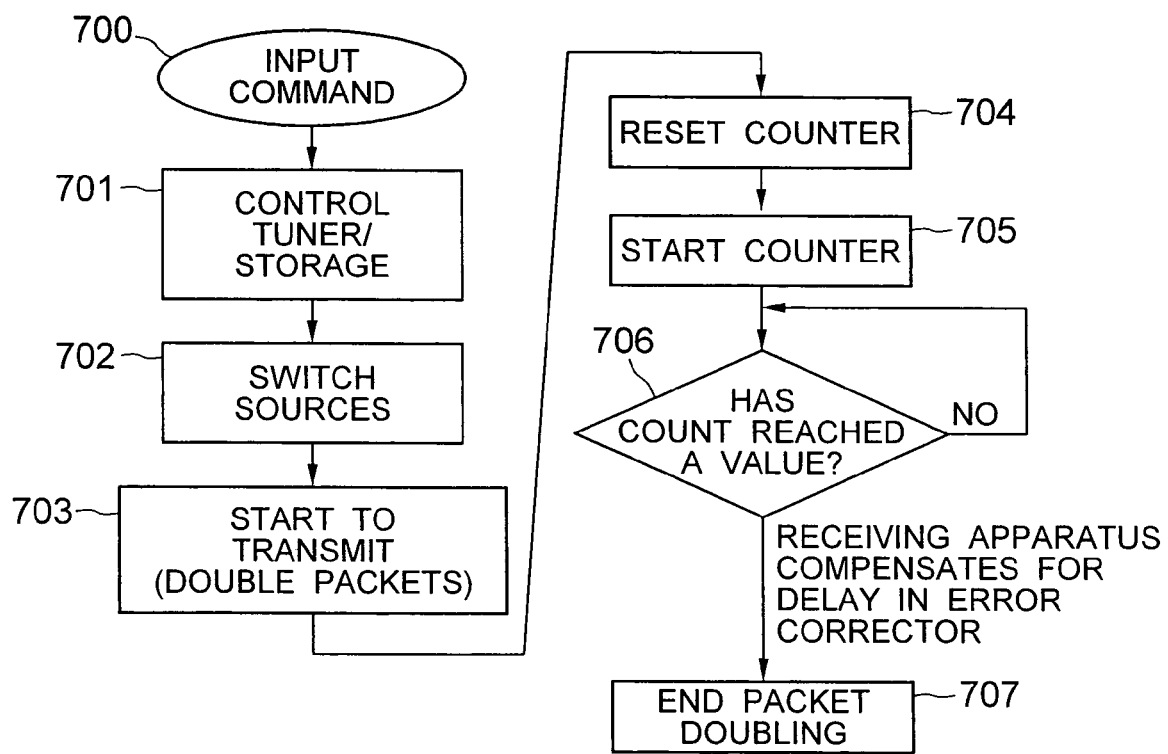
FIG. 7 is a flowchart for the operation of the delivery controller 11 in the second embodiment of the invention.

FIG. 7 is a flowchart of the operation of the delivery controller 11 in the second embodiment of the invention. The operation will be described with reference to FIG. 7.

(1) When the delivery controller 11 receives a video source switching command sent via the command interpreter 10 from the receiving apparatus, it controls the tuner 3 or storage 4 so that the video sources can be switched (steps 700 and 701).

(2) Then, the delivery controller 11 controls the switching device 5 to select the video source according to the command, and supply the video packets to the redundancy adder 6. The redundancy adder 6 adds redundant packets to the video packets and supplies them to the transmission buffer 7 (step 702).

(3) Subsequently, the delivery controller 11 sends a transmission start instruction to the transmitter 8. At this time, the delivery controller 11 orders the transmitter 8 to double and transmit the video packets. Consequently, the moving picture is started to transmit, but the amount of video packets is doubled (step 703).

(4) The delivery controller 11 then resets the counter 62, and causes the counter 62 to start counting the number of the packets fed from the transmitter 8 (steps 704 and 705).

(5) Thereafter, the delivery controller 11 checks the count in order to compensate for the delay in the error corrector 13 provided within the receiving apparatus 2, and waits until the error corrector 13 produces the corrected moving-picture packets. At the instant when the corrected packets are produced, the delivery controller 11 sends the packet-doubling stop instruction to the transmitter 8. The transmitter 8 goes back to the normal operation for producing the moving-picture packets (steps 706, 707).

As a result of the above process, the moving-picture packets transmitted from the delivery apparatus 1 to the receiving apparatus 2 are doubled only during the delay time that the moving picture undergoes in the error corrector 13 of the receiving apparatus 2 from the start of transmitting the selected moving-picture packets. The dropout packet processor 61, which is provided at the stage following to the network connector 12 of the receiving apparatus 2, detects the doubled packets and changes them to the normal single-part packets. If one packet drops out, the other corresponding packet is taken from the other part packets and produced. The moving-picture packets produced from the dropout packet processor 61 are supplied to the error corrector 13, and also fed to the counter 17 and selector 14. The subsequent operation of the receiving apparatus 2 is the same as in the first embodiment of the invention mentioned with reference to FIG. 1~FIG. 5.

According to the second embodiment of the invention mentioned above, when the display device displays a frozen frame of the moving-picture packets not passed through the error corrector 13 of the receiving apparatus 2, noise can be prevented from being mixed in the frozen frame due to the fact that the moving-picture packets some of which could drop out in the network would not be corrected. Thus, as compared to the first embodiment, displaying can be made more satisfactorily at the time of source switching.

The second embodiment of the invention utilizes the command to double the packets that is supplied to the transmitter 8 of the delivery apparatus 1. Thus, the amount of moving-picture packets temporarily becomes twice as much to consume the network bandwidth the more. However, since the doubled packets are transmitted only during the delay time that the packets undergo when they are passed through the error corrector 13, it does not become a big problem. In addition, if the packets are duplicated in place of doubling, and if the number of the duplicated packets is previously adjusted according to the network environment, the above-described problem can be completely solved.

FIG. 8 is a block diagram of the construction of the delivery apparatus in the moving-picture transmission system according to the third embodiment of the invention. In FIG. 8, there are shown an error detector 81, a retransmission controller 82, a post-transmission buffer 83, a retransmission buffer 84, an UDP layer 85, an IP layer 86, a MAC layer 87, and a physical layer 88. Like elements corresponding to those in FIG. 1 are identified by the same reference numerals. Different parts from the first embodiment of the invention mentioned with reference to FIG. 1~FIG. 5 will be described with reference to FIG. 8.

The network connector 9 of the delivery apparatus 1 is not described in detail about its construction in the sections of the first and second embodiments of the invention. The network connector 9 in the third embodiment, as illustrated in FIG. 8, has the UDP (User Datagram Protocol) layer 85, the IP (Internet Protocol) layer 86, the MAC (Media Access Control) layer 87 and the physical layer 88 as well known. The delivery apparatus 1 shown in FIG. 8 is greatly different from the delivery apparatus 1 shown in FIG. 1 in that the error detector 81 is provided at the MAC layer 87 of the network connector 9, and that the retransmission controller 82 for making retransmission control, the post-transmission buffer 83 and the retransmission buffer 84 are provided in the delivery apparatus 1.

In the delivery apparatus 1 according to the third embodiment of the invention constructed as above, when the transmitter 8 generates moving-picture packets, the packets are passed through the UDP layer 85, IP layer 86, MAC layer 87, and Physical layer 88 in turn. In the UDP system for transmitting the moving picture, at the instant when the transmitter 8 supplies the moving-picture packets to the UDP layer 85, a reply of good success is sent irrespective of whether the actual transmission is successful or not. In practice, when the MAC layer 87 as a data link layer produces moving picture packets, it makes data transmission in response to the notice of having had good reception from the other party (here, the receiving apparatus 2 shown in FIG. 1). If the notice of having had good reception is not given, the MAC layer 87 makes process for retransmission several times, but finally gives up the retransmission so that the output timing of the next moving-picture packets can be prevented from overlapping on this retransmission. If it gives up, some of the sent moving picture packets are considered as having dropped out. The information of having given up is not sent to the transmitter 8.

In the third embodiment of the invention, the error detector 81 detects the above situation, and informs the retransmission controller 82 of this fact. The retransmission controller 82, since the moving picture packets produced from the transmitter 8 are also stored in the post-transmission buffer 83, takes out the ones corresponding to the lost packets from the post-transmission buffer 83, and supplies them to the retransmission buffer 84. The transmitter 8 alternately checks the moving packets in the transmission buffer 7 and those in the retransmission buffer 84. If the moving picture packets exist in the retransmission buffer 84, the transmitter 8 transmits those packets.

According to the third embodiment of the invention, as a result of the above operation, the delivery apparatus can judge whether a dropout of moving picture has occurred or not, whereas the prior art cannot judge whether the dropout of moving picture packets has occurred or not by any means except for the notice from the receiving apparatus. Thus, in this embodiment, as compared to the case in which the retransmission process is made in response to the notice from the receiving apparatus, the packs corresponding to the lost packets can be immediately transmitted when the dropout occurs. Moreover, in the third embodiment of the invention, while the receiving apparatus would be required to provide a separate buffer in the receiving portion by which the moving picture reproduction is delayed until the moving picture packets are completely reloaded by the retransmission, the moving picture can be swiftly displayed even if prompt operation of video source switching (channel selection of tuner) is necessary because the third embodiment has reduced the delay.

In each of the embodiments of the invention mentioned above, when the delivery apparatus 1 and the receiving apparatus 2 are connected by a wired network and via switching hubs and routers along the path, almost no dropout of packets occurs in the MAC layer, but when those apparatus 1 and 2 are connected to the same IP network like a wireless network, the delivery apparatus is sure to detect the dropout of moving picture packets, so that the third embodiment mentioned above is very effective to improve the communication quality.

In addition, according to the third embodiment of the invention mentioned above with reference to FIG. 8, when a dropout of moving picture packets occurs, the delivery apparatus 1 sequentially makes retransmission of packets. For example, when the dropout of moving picture packets is detected that exceeds the redundancy of the error corrector of the receiving apparatus side, only the retransmission of packets within the error correction unit (frame) can be performed from that time point in accordance with this redundancy. Thus, the number of packets to be retransmitted can be reduced.

Moreover, in the third embodiment, the MAC layer 87 may have the retransmission controller 82 and the retransmission buffer 84 incorporated as a MAC driver to make the retransmission in accordance with the redundancy of the error corrector of the receiving apparatus side only when the packets are supplied to a particular port.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method of transmitting moving picture data between a delivery apparatus and a receiving apparatus connected by a network, said method comprising the steps of:

on said delivery apparatus side, doubling packets of said moving picture data and starting to transmit said doubled packets of said moving picture data after the switching to a source is made according to a command to switch to said source of said moving picture data, said command being sent from said receiving apparatus, and at the same time, causing a counter to start counting so that, when the output from said an error corrector of said receiving apparatus becomes effective, said doubling of said packets of said moving picture data can be stopped, followed by the transmission of said moving picture data not doubled; and on said receiving apparatus side, restoring said doubled packets of said selected moving picture data to the original single-part packets with the lost packets compensated for, correcting said restored moving picture data by said error corrector, and at the same time, until said error corrector produces corrected data, causing said moving picture data not corrected yet to be processed by a decoder so that a frozen frame of said moving picture data can be produced and displayed.

2. A system for transmitting moving picture data between a delivery apparatus and a receiving apparatus connected by a network, said system comprising:

said delivery apparatus having means for switching to a source according to a command to switch to said source of said moving picture data, said command being sent from said receiving apparatus; and said receiving apparatus having error correcting means, selector means, a decoder, display means, and input means;

wherein said command to switch to said source is transmitted from said input means to said delivery apparatus, said error correcting means corrects errors of the packets of said selected moving picture data transmitted from said delivery apparatus, and until said error corrector produces corrected data, said selector means is controlled to supply said moving picture data not corrected yet to said decoder in which said non-corrected moving picture data is processed to produce a frozen frame that is displayed on said display means; and wherein said delivery apparatus further has post-transmission buffer means for holding the same data as said transmitted moving picture data, and error detecting means provided within a MAC driver of a data link layer so that, when an error of said moving picture data in said data link layer is detected, said moving picture data retained in said post-transmission buffer means is retransmitted to said receiving apparatus.

3. A system according to claim 2, wherein said retransmission of said moving picture data is performed when a dropout of said moving picture data occurs exceeding a redundancy in said error correcting means of said receiving apparatus.

4. A system according to claim 3, wherein said retransmission of said moving picture data is carried out by said MAC driver of said data link layer.

5. A system for transmitting moving picture data between a delivery apparatus and a receiving apparatus connected by a network, said system comprising:

said delivery apparatus having means for switching to a source according to a command to switch to said source of said moving picture data, said command being sent from said receiving apparatus, and counter means for counting the time elapsing until the output from error correcting means of said receiving apparatus becomes effective, whereby said delivery apparatus, after said switching to said source according to said command, doubles the packets of said moving picture data and starts to transmit said doubled packets, and at the same time, it causes said counter means to start counting until the output from said error correcting means of said receiving apparatus becomes effective and when said output becomes effective, and when said output becomes effective it stops said doubling of said packets of said moving picture data, and transmits said moving picture data; and said receiving apparatus having said error correcting means, selector means, a decoder, display means, input means and dropout packet processing means, whereby said receiving apparatus causes said dropout packet processing means to restore said doubled packets of said selected moving picture to a single-part packets with the lost compensated for, and controls said error correcting means to correct errors of said restored moving picture data, and until said error correcting means produces corrected data it controls said selector means to supply said moving picture data not corrected yet to said decoder so that said decoder can produce a frozen frame which is then displayed in said display means.

6. A delivery apparatus in a system for transmitting moving picture data between said delivery apparatus and a receiving apparatus connected by a network, said delivery apparatus comprising:

means for switching to a source according to a command to switch to said source of said moving picture data, said command being sent from said receiving apparatus;

post-transmission buffer means for holding the same data as the moving picture data transmitted; and error detecting means provided within a MAC driver of a data link layer, whereby, when said detecting means detects an error of said moving picture data in said data link layer, said delivery apparatus retransmits said data retained in said post-transmission buffer means as said transmitted moving picture data.

7. A delivery apparatus in a system for transmitting moving picture data between said delivery apparatus and a receiving apparatus connected by a network, said delivery apparatus comprising:

means for switching to a source according to a command to switch to said source of said moving picture data, said command being sent from said receiving apparatus; and counter means for counting the time elapsing until the output from error correcting means provided within said receiving apparatus becomes effective, whereby, after switching to said source according to said command from said receiving apparatus, said delivery apparatus doubles the packets of said moving picture data and starts to transmit said doubled packets, and at the same time, it causes said counter means to start counting until the output from said error correcting means of said receiving apparatus becomes effective, and when said output becomes effective, it stops said packets of said moving picture data from being doubled, and transmits said moving picture data.

8. A receiving apparatus in a system for transmitting moving picture data between a delivery apparatus and said receiving apparatus connected by a network, said receiving apparatus comprising:
  error correcting means;
  selector means;
  a decoder;
  display means;
  input means; and
  dropout packet processing means,
  whereby said receiving apparatus forces said input means to transmit a source switching command to said delivery apparatus, and after said source is selected by switching, controls said dropout packet processing means to receive the doubled packets of said moving picture data transmitted from said delivery apparatus until the output from said error correcting means becomes effective and to restore them to the original single-part packets of said data with the lost packets compensated for, and causes said error correcting means to correct said moving data, and at the same time, until said error correcting means produces corrected data it controls said selector means to supply said moving picture data not corrected yet to said decoder, and causes said decoder means to produces a frozen frame of said data, and to supply it to said display means where said frozen frame is displayed.

* * * * *